Patented Dec. 16, 1952

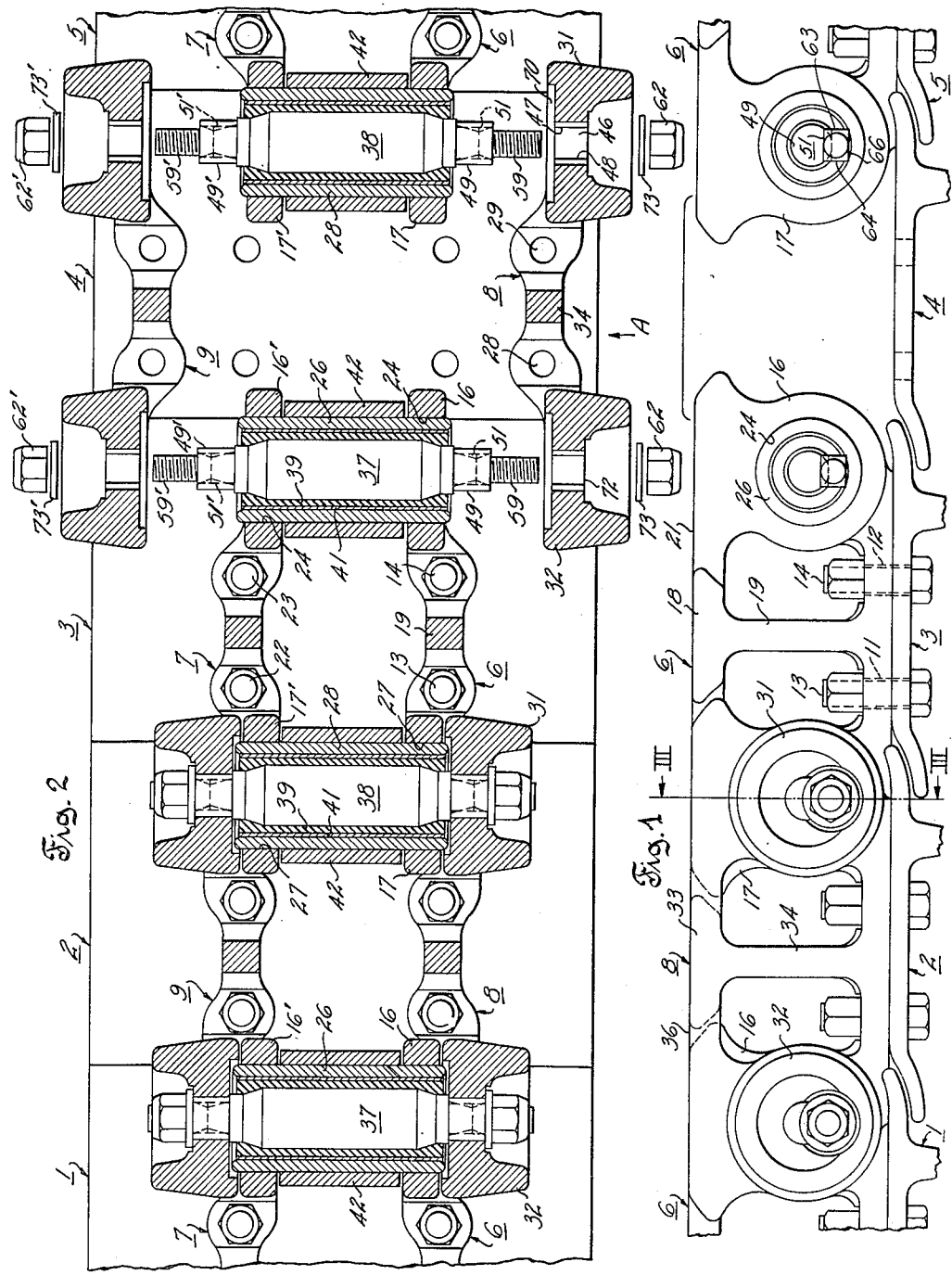

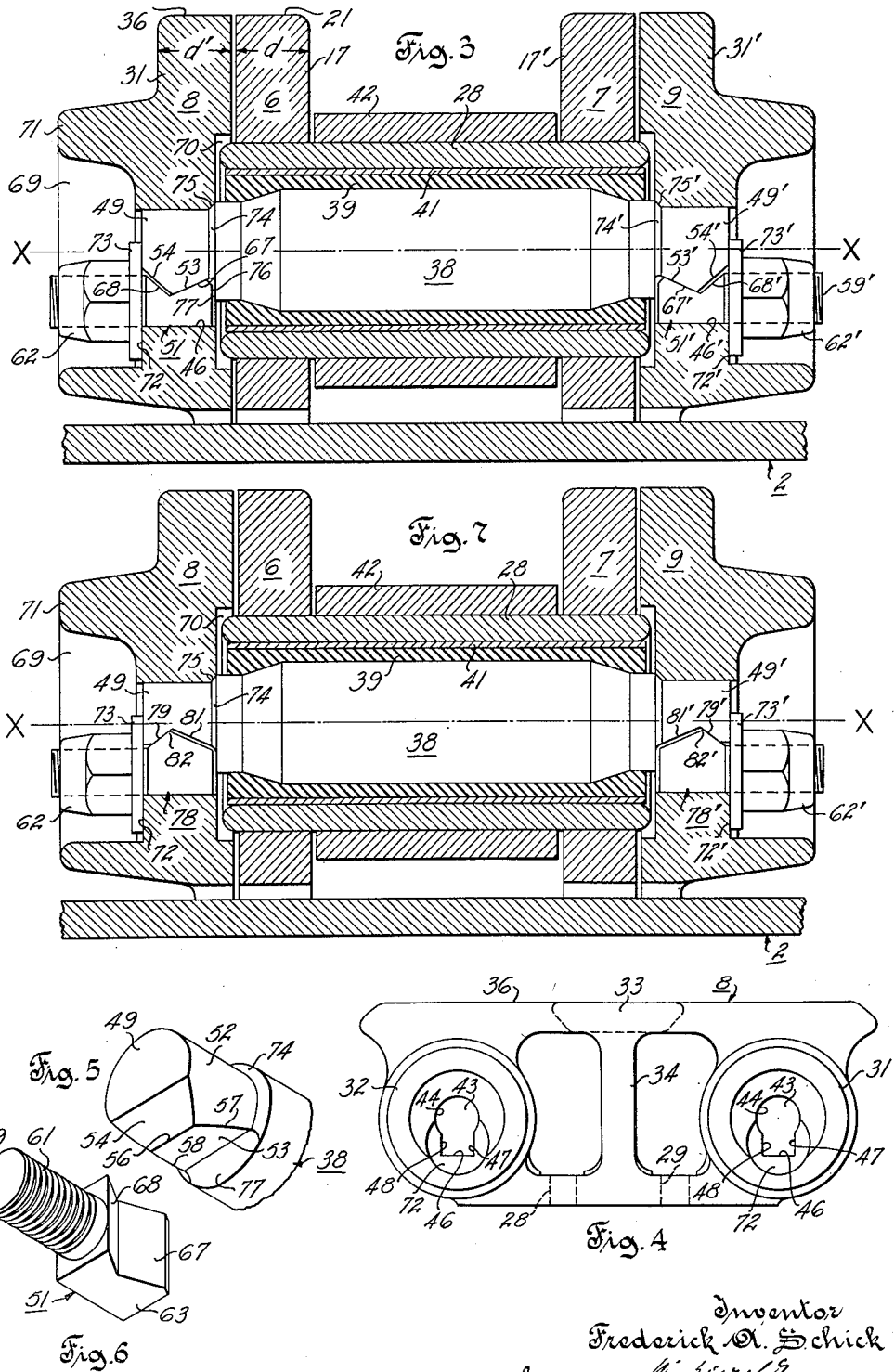

2,621,981

UNITED STATES PATENT OFFICE 2,621,981

TRACK LINK FOR CRAWLER TRACTORS

Frederick A. Schick, Springfield, Ill., assignor to Allis-Chalmers Manufacturing Company, Milwaukee, Wis.

Application February 28, 1951, Serial No. 213,177

9 Claims. (Cl. 305—10)

The invention relates to track belts for crawler tractors, and it is concerned more particularly with a link type track belt in which adjacent links are pivotally connected together by means of a hinge pin and a bushing surrounding the hinge pin.

Link type track belts which have been known and extensively used in selflaying track vehicles for many years ordinarily incorporate pivot joints of the pin and bushing type and, in accordance with established practice, these joints are permanently assembled by a pressing operation, except for one joint, usually termed the master joint, which is specially constructed so that one pair of relatively adjacent track links can be readily connected with and disconnected from each other without the use of heavy equipment. U. S. Patent 1,946,911 dated February 13, 1934, and granted to I. F. Lindberg et al. for Method of and Apparatus for Assembling Chain Structures discloses details of construction and a hydraulic press as heretofore employed in permanently assembling pivot joints of the pin and bushing type between relatively adjacent links of a track belt for crawler tractors.

The principal object of the present invention is to provide an improved link type track belt incorporating hinge pins and bushings, and more particularly one which may be readily serviced in the field, without the use of heavy equipment, when it becomes necessary to replace a wornout link or a wornout pivot joint between any pair of relatively adjacent links.

Another object of the invention is to provide an improved mounting of a hinge pin on opposite side bars of a track link, the improved mounting being such that the side bars may readily be secured to and detached from the hinge pin by means of ordinary tools such as a medium size wrench and a medium weight hammer which may be carried in the tool box of the vehicle for field servcice.

A further object of the invention is to provide an improved releasable hinge pin mounting of the hereinabove outlined character which will positively lock the hinge pin against rotation in the side bars.

A further object of the invention is to provide an improved releasable hinge pin mounting of the hereinabove outlined character which will positively secure the side bars against axial outward movement relative to the hinge pin, so that the hinge pin will also serve as brace for taking up lateral thrust loads which tend to spread the side bars apart transversely of the track belt.

A further object of the invention is to provide a track link incorporating the hereinabove outlined features of improvement and which is simple, sturdy and compact, and which may be manufactured at relatively low cost.

The foregoing and other objects and advantages are attained by the present invention, various novel features of which will be apparent from the description herein and the accompanying drawings, and will be more particularly pointed out in the appended claims.

Referring to the drawings:

Fig. 1 is a side view of track belt parts for a crawler tractor, a series of pivotally interconnected track links being shown at the left, and part of another track link being shown at the right and disconnected from the track links at the left of the figure;

Fig. 2 is a sectional top view of the track links shown in Fig. 1, two additional side bars and other parts not shown in Fig. 1 being shown in Fig. 2 in detached relation to the track links at the right and left of Fig. 2;

Fig. 3 is a sectional view on line III—III of Fig. 1;

Fig. 4 is a detail view of a side bar appearing in Fig. 2;

Fig. 5 is a perspective view of one end of a hinge pin appearing in Fig. 3;

Fig. 6 is a perspective view of a wedge member appearing in Fig. 3; and

Fig. 7 is a sectional view similar to Fig. 3 and illustrating a modified embodiment of the invention.

At the bottom of Fig. 1, five track shoes of conventional construction, such as commonly used in track belts for crawler tractors, are designated by the reference characters 1, 2, 3, 4 and 5, respectively. Each of the track shoes 1, 3 and 5, that is every other of the track shoes 1 to 5, is secured to a first type of track link which comprises a pair of inner side bars 6 and 7, as shown at the right and left ends and at the middle of each of Figs. 1 and 2. In the assembled track belt, the links of the mentioned first type alternate with links of a second type which comprises a pair of outer side bars 8 and 9 such as are illustrated in Figs. 1 and 2 at the upper side of the track shoe 2. Another pair of outer side bars 8 and 9 is shown in Fig. 2 in detached relation to the track shoe 4, to illustrate a procedural step in the assembly of the track belt which will be more fully explained hereinbelow.

The inner side bars 6 and 7 are of identical construction which is best illustrated by the side view of the bar 6 which, as shown in Fig. 1, is secured to the track shoe 3, and by the sectional views of the same side bar in Figs. 2 and 3. The lower part of the side bar 6 is somewhat irregularly shaped, as shown in Fig. 2, and has two vertical holes 11 and 12 for the reception of track shoe mounting bolts 13 and 14, respectively. Integrally formed with and extending upwardy from the bottom part of the side bar 6 are two end portions, one of which is shown in side elevation in Fig. 1 and designated in that figure and in Fig. 2 by the reference character 16. The other end portion of said side bar 6 is designated in Figs. 2 and 3 by the reference character 17, the end portion 17 being shaped similarly to the end portion 16 as indicated in dotted outline in Fig. 1. The end portions 16 and 17 merge with an upper midpart 18 of the side bar 6, and a strut 19 merges with and extends vertically between the lower part and the upper midpart of the side bar. The end portions 16 and 17, and the midpart 18 of the side bar 6 present a horizontal rail surface 21, the transverse width of which at the end portions 16 and 17 is indicated in Fig. 3 by the distance $d$. The transverse width of the rail surface 21 at the midpart 18 is about twice the distance $d$, the midpart 18 being transversely extended toward the outer side of the side bar 6.

The inner side bar 7 opposite to the side bar 6 at the upper side of the track shoe 3, as shown in Fig. 2, is an exact duplicate of the side bar 6, and the track shoe 3 is secured to the side bar 7 by bolts 22 and 23 corresponding to the bolts 13 and 14. The end portions 16 of the side bar 6, and the corresponding end portions 16' of the side bar 7, each have a cylindrical bore 24 for the reception of a hinge bushing 26, as best shown in Fig. 2. The end portion 17 of the side bar 6, and the corresponding end portion 17' of the side bar 7 each have a cylindrical bore 27 for the reception of another hinge bushing 28 which is an exact duplicate of the hinge bushing 26.

The foregoing explanations with reference to the inner side bars 6 and 7 at the track shoe 3, similarly apply to the inner side bars 6 and 7 parts of which are shown at the left of Figs. 1 and 2, and to the inner side bars 6 and 7 parts of which are shown at the right of Figs. 1 and 2. Each of the track shoes 1, 3 and 5 is bolted to a link structure which comprises an inner side bar 6 at one side, an inner side bar 7 at the other side, a hinge bushing 26 at one end, and a hinge bushing 28 at the other end. These link structures may be assembled individually and independently of each other, by pressing one pair of side bars 6 and 7 simultaneously and in opposite directions upon one pair of hinge bushings 26 and 28, preferably by means of a hydraulic press. After such press assembly, the unit comprising a pair of inner side bars 6 and 7 and a pair of hinge bushings 26, 28 forms a substantially rigid, permanently assembled link structure to which a track shoe may be secured by means of bolts, such as the bolts 13, 14, 22 and 23 which have been pointed out hereinbefore in connection with the track shoe 3, the bolts having nuts for tightening them as is the usual practice in track belts for crawler tractors.

The outer side bar 8 which is shown in Figs. 1 and 2 at the lower side of the track shoe 2 is identical in construction with the side bar 8 which is shown at the right of Fig. 2 in detached relation to the track shoe 4. Fig. 4 shows a side view of the detached side bar 8, the view of Fig. 4 being taken in the direction of arrow A in Fig. 2, that is horizontally from the outer side of the bar. Comparing the lower part of the detached outer side bar 8 with the lower part of the inner side bar 6 on the track shoe 3, as shown in Fig. 2, it will be noted that the bottom part of the side bar 8 is shaped opposite hand to the lower part of the side bar 6, and that vertical holes 28 and 29 for the reception of track shoe mounting bolts are formed in the lower part of the side bar 8, the same as in the lower part of the side bar 6. Integrally formed with and extending upwardly from the bottom part of the side bar 8 are two end portions 31 and 32, as shown in side elevation in Fig. 4, and in horizontal section in Fig. 2. The end portions 31 and 32 merge with an upper midpart 33 of the side bar 8, and a strut 34 merges with and extends vertically between the lower part and the upper midpart 33 of the side bar 8. The end portions 31 and 32, and the midpart 33 present a horizontal rail surface 36, the transverse width of which at the end portions 31 and 32 is indicated in Fig. 3 by the distance $d'$, which distance is substantially equal to the transverse width $d$ of the rail surface 21 on the end portions 16 and 17 of the side bar 6. The transverse width of the rail surface 36 at the midpart 33 of the side bar 8 is about twice the distance $d'$, the midpart 33 being transversely extended toward the inner side of the side bar 8.

The outer side bars 9 shown in the upper part of Fig. 2 are exact duplicates, respectively, of the side bars 8 shown in the lower part of Fig. 2.

The permanently assembled link structure to which the track shoe 3 is secured by the bolts 13, 14, 22 and 23 mounts two hinge pins, one designated by the reference character 37 and surrounded by the hinge bushing 26, and the other designated by the reference character 38 and surrounded by the hinge bushing 28. The portion of the hinge pin 37 which is surrounded by the hinge bushing 26 is radially spaced from the cylindrical inside surface of the bushing 26 and a sleeve 39 of rubber like material is operatively disposed in the annular space between the hinge pin 37 and the bushing 26 to floatingly connect the pin in radial load transmitting relation with the bushing. The sleeve 39 is bonded to the hinge pin and to a bushing 41 which in turn is press fitted into the hinge bushing 26, and in the assembled condition of the pin 37 and bushing 26, as shown in Fig. 2, the sleeve 39 is in a state of radial compression and axial expansion. In these respects, the herein disclosed mounting of the hinge pin 37 in the bushing 26 generally conforms with well known principles which are disclosed, for instance, in U. S. Patent 2,362,008 issued on November 7, 1944, to Heston H. Hile for Resilient Bearing.

The permanently assembled link structure to which the track shoe 3 is secured mounts another hinge pin 38, in its hinge bushing 28, as stated, and each of the other permanently assembled link structures which are each composed of a pair of inner side bars 6 and 7 and a pair of hinge bushings 26 and 28, similarly mount a pair of hinge pins 37 and 38 in their respective bushings 26 and 28. The hinge pin 37 which is shown at the left end of Fig. 2 represents one of the two hinge pins which are mounted on the permanently assembled link structure to which the track shoe 1 is secured, and the hinge pin 38 which is shown at the right of Fig. 2 represents one of the two hinge pins which are mounted on the permanently assembled link structure to which the track shoe 5 is secured. All of the hinge pins 37 and 38 are of exactly identical construction, and each is rubber mounted in its surrounding bushing in the manner explained hereinbefore. Each of the bushings 26 and 28 is surrounded by a rotatable sleeve 42 in conformity with customary practice.

In the left part of Fig. 2, one pair of outer side bars 8 and 9 and one pair of hinge pins 37, 38 are shown in assembled condition, and in the right part of Fig. 2 another pair of outer side bars 8 and 9 and another pair of hinge pins 37, 38 are shown in disassembled condition. Provisions for detachably connecting the outer side bars 8 and 9 with their respective hinge pins 37, 38 are made as follows.

Referring to Fig. 4, the end portion 31 of the side bar 8 has a keyhole shaped aperture 43 which presents a cylindrical surface 44 at its upper part, and straight bottom and side surfaces 46, 47 and 48, respectively, at its lower channel part, all of the surfaces 44, 46, 47 and 48 extending transversely of and clear through the side bar 8, as shown in Fig. 3. In the assembled condition of the parts as shown in Fig. 3, an end portion 49 of the hinge pin 38, and a wedge member 51 are disposed within the keyhole shaped aperture 43 of the side bar 8, the shape of the end portion 49 and of the wedge member 51 being more clearly illustrated by the perspective views of Figs. 4 and 5. The end portion 49 of the hinge pin 38 has a cylindrical, axially extending external surface portion 52 (Fig. 5) which is intersected by two plane external surface portions 53 and 54 extending transversely of and obliquely in opposite directions to the axis X—X (Fig. 3) of the hinge pin 38 so as to form a transverse ridge 56 on the end portion 49. The external surface portion 53 presents an external wedge seating surface which extends straight between circumferentially spaced edge lines 57 and 58 (Fig. 5) on the periphery of the end portion 49 of the hinge pin 38.

The wedge member 51 comprises a block which is slidable back and forth in the channel part of the keyhole shaped aperture 43 of the side bar 8, and a shank 59 which has screw threads 61 for the reception of a nut 62 (Fig. 3). In the disassembled condition of the parts as shown at the right of Fig. 2, the end portion 49 of the pin 38 and the wedge member 51 are arranged in the same relation to each other as in Fig. 3; and at the right end of Fig. 1, the hinge pin 38 and the wedge member 51 are shown in end elevation detached from the side bar 8. As shown in said end elevation, the wedge member 51 has parallel, opposite side surfaces 63 and 64 at a transverse spacing from each other slightly less than the transverse spacing between the side surfaces 47 and 48 of the keyhole shaped aperture 43 (Fig. 4), so that the wedge member will have a loose sliding fit in the channel part of said aperture. At its lower side (Fig. 2), the wedge member 51 has a straight load transmitting surface 66 for cooperative engagement with the bottom surface 46 of the aperture 43, said bottom surface presenting an internal wedge seating surface formed on the side bar 8. At its upper side, as best shown in Fig. 6, the wedge member 51 has two oppositely inclined surfaces 67 and 68 which extend at right angles to the planes of the side surfaces 63 and 64, the same as the load transmitting surface 66. The relative inclination of the surfaces 67 and 68 of the wedge member 51 is the same as the relative inclination of the oblique surfaces 53 and 54 of the end portion 49 of the hinge pin 38, the surfaces 67 and 68 defining a groove in the wedge member 51.

In the assembled condition of the parts, as shown in Fig. 3, the groove which is defined by the surfaces 67 and 68 straddles the ridge 56 which is formed by the relatively inclined external flats 53 and 54 on the end portion 49 of the hinge pin 38. The position of the wedge member 51 on the end portion 49 is such that the shank 59 extends axially outward from the hinge pin 38, and into a round cavity 69 which is formed at the outer side of the side bar 8 by an annular lip 71. The bottom of the cavity 69 is spot faced to provide a seat 72 for a washer 73 which surrounds the shank 59 of the wedge member 51. Turning of the nut 62 on the threaded shank 59 in tightening direction while the washer 73 bears against the side bar 8 at the spot face 72 and while the nut 62 bears against the washer, forces the inclined flat 67 of the wedge member 51 into engagement with the inclined external wedge seating surface 53 of the end portion 49 of the hinge pin 38. The resulting tendency of the wedge member 51 to move obliquely away from the axis X—X of the hinge pin 38 in the general direction toward the axially outer extremity of the end portion 49 causes the load transmitting surface 66 of the wedge member 51 to firmly bear against the internal wedge seating surface 46 of the side bar 8. The thrust reaction between the inclined surfaces 53 and 67 also subjects the hinge pin 38 to axial pull in the direction toward the side bar 8, which causes a beveled shoulder 74 (Fig. 3) on the pin 38 to bear firmly against a bevel surface 75 at the inner side of the side bar 8. The bevel surface 75 is formed concentrically with a counterbore 70 (Fig. 3) at the inner side of the side bar 8, such counterbore being provided to accommodate an end portion of the sleeve 28 which projects a short distance outwardly from the inner side bar 6.

The cylindrical outer surface 52 of the end portion 49 of the pivot pin 38 is diametrically dimensioned to afford an axial sliding fit of that surface on the cylindrical surface 44 of the keyhole shaped aperture 43. The wedge member 51 projects radially outward from the end portion 49 into the channel part of the keyhole shaped aperture 43, and cooperative engagement of the surfaces 63 and 64 of the wedge member 51 with the side surfaces 47 and 48 of the side bar aperture 43, and of the wedge surface 67 with the external wedge seating surface 53 of the end portion 49, locks the pin 38 against rotation on its axis relative to the side bar 8. Tightening of the nut 62 on the shank 59 locks the pin 38 axially on the side bar 8 in the position in which the pin is shown in Fig. 3, axial displacement of the pin toward the right in Fig. 3 being positively prevented by cooperative engagement of the inclined surfaces 53 and 67 and by cooperative engagement of the nut 62 with the washer 73, and by cooperative engagement of the washer 73 with the spot face 72.

Removal of the nut 62 from the shank 59 releases the side bar 8 for removal from the hinge pin 38. It will be noted that in the assembled condition of the parts as shown in Fig. 3 the inclined surface 68 of the wedge member 51 is separated by a slight gap from the inclined surface 54 on the end portion 49 and that the vertical end face 76 of the wedge member 51 is axially spaced from a radial surface portion 77 on the hinge pin 38. After the nut 62 has been loosened by a few turns it may be struck with a hammer to loosen the wedge member 51 by driving it axially inward on the pivot pin 38 until its vertical end face 76 engages the radial surface portion 77 of the hinge pin. Thereafter, the nut 62 may be completely removed from the shank 59 to permit withdrawal of the side bar 8 from the end portion 49 of the pivot pin and from the wedge member 51 which will stay on the pin until the side bar has been removed.

The foregoing explanations with respect to the mounting of the hinge pin 38 on the side bar 8 as shown at the left of Fig. 3, analogously apply to the mounting of the hinge pin 38 on the side bar 9 as shown at the right of Fig. 3. A second internal wedge seating surface 46', corresponding to the first internal wedge seating surface 46 of the side bar 8, is afforded by a keyhole shaped aperture in the side bar 9, and a second external wedge seating surface 53' corresponding to the first external wedge seating surface 53 on the end portion 49, is formed on the other end portion 49' of the hinge pin 38. A second wedge member 51', corresponding to the first wedge member 51, is slidably cooperable with the second external wedge seating surface 53'; and a load transmitting surface portion 66' of the second wedge member 51', corresponding to the load transmitting surface portion 66 of the first wedge member 51, is engageable with the second internal wedge seating surface 46' upon sliding movement of the second wedge member 51 on the second external wedge seating surface in wedge tightening direction obliquely away from the axis X—X of the hinge pin 38. Like the first wedge member 51, the second wedge member 51' has a shank, designated 59', and a nut 62' and a washer 73', corresponding to the nut 62 and washer 73, are provided for moving the second wedge member 51' in wedge tightening direction relative to the hinge pin 38.

The first internal wedge seating surface 46 and the second internal wedge seating surface 46' extend parallel to the axis X—X of the hinge pin 38, and the first and second external wedge seating surfaces 53 and 53' are inclined in opposite directions relative to the axis X—X of the hinge pin 38. More specifically, the inclination of the first external wedge seating surface 53 is such that sliding movement of the first wedge member 51 thereon in a direction toward the axially outer extremity of the end portion 49 of the hinge pin 39 will establish cooperative engagement of the load transmitting surface portion 66 of the first wedge member 51 with the first internal wedge seating surface 46; and the inclination of the second external wedge seating surface 53 is such that sliding movement of the second wedge member 51' thereon in a direction toward the axially outer extremity of the end portion 49' of the hinge pin 38 will establish cooperative engagement of the load transmitting surface portion 66' of the second wedge member 51 with the second internal wedge seating surface 46'.

As has been pointed out hereinbefore, all of the hinge pins 37 and 38 are constructed exactly alike, and in order to connect a pair of outer side bars 8 and 9 with one pair of hinge pins 37 and 38, as shown at the left of Fig. 2, each of these bars has one keyhole shaped aperture 43 in one of its end portions, as shown at the right of Fig. 4, and a second keyhole shaped aperture at its other end, as shown at the left of Fig. 4. The two keyhole shaped apertures of each side bar 8 and 9 are duplicates, and in Fig. 4 the same reference characters which are applied to the keyhole shaped aperture in the end portion 31 of the side bar 8 have also been applied to the identically shaped aperture in the end portion 32 of said side bar. The side bar 9 is a duplicate of the side bar 8, as has been pointed out hereinbefore, and the explanations hereinbefore with respect to the shape, function and arrangement of the keyhole shaped apertures 43 and their cooperating wedge members 51 analogously apply to the side bar 9.

A track belt constructed as disclosed and as explained herein with reference to the drawings, may readily be serviced in the field, without use of heavy equipment, when it becomes necessary to replace a worn out pivot joint between any pair of relatively adjacent track links, that is, between a permanently assembled track link, comprising a pair of inner side bars 6, 7 and a pair of bushings 26 and 28, and a detachably assembled track link comprising a pair of outer side bars 8, 9, a pair of hinge pins 37, 38, and wedge members 51, washers 73 and nuts 62 associated with the hinge pins. Similarly, any of the permanently assembled track links may readily be removed as a unit and replaced by a new one, if desired. For instance, let it be assumed that the second pivot joint from the left in Fig. 2 has failed due to failure of the rubber sleeve 39 at the left end of the permanently assembled track link to which the track shoe 3 is secured. In that case, the track belt may be opened up by removing the outer side bars 8 and 9 of the track link at the right, which in Fig. 2 is shown in disassembled condition, and the track link at the left, which in Fig. 2 is shown in assembled condition. After the permanently assembled track link with the defective rubber bushing has thus been isolated, it may be removed and a new unit installed in its place incorporating new inner side bars 6 and 7, bushings 26 and 27, outer sleeves 42, hinge pins 37 and 38, rubber sleeves 39 and bushings 41. The previously removed outer side bars 8 and 9 may then readily be reinstalled to place the track belt in operative condition, as will be apparent from the foregoing explanations.

The modified embodiment of the invention which is illustrated by Fig. 7, incorporates two wedge members 78, 78' which differ in shape from the wedge members 51, 51' shown in Fig. 3, and the hinge pin 38 as shown in Fig. 7 is modified in conformity with the shape of the wedge members 78, 78'. In Fig. 7, the hinge pin 38 has at its left end 49 a cylindrical axially extending external surface portion which is intersected by two plane external surface portions 79 and 81 extending transversely of and obliquely in opposite directions to the axis X—X of the hinge pin so as to form a transverse groove in the end portion 49 of the hinge pin. The wedge member 78 has a ridge 82 projecting into the groove formed by the oppositely inclined surface portions 79 and 81 on the end portion 49. The details of the connection between the hinge pin 38 and the outer side bar 8 as shown at the left of Fig. 7 are the same as the details of the connection between the hinge pin 38 and the outer side bar, as shown at the right of Fig. 7. The primed reference characters at the right of Fig. 7 designate the same parts which at the left of Fig. 7 are designated by corresponding reference characters without primes. The function and the mode of operation of the modified construction shown in Fig. 7 correspond to the function and mode of operation of the construction shown in Fig. 3, as will be apparent from the explanations hereinbefore with respect to the construction shown in Fig. 3.

It should be understood that it is not intended to limit the invention to the particular form and details described hereinbefore, and that the invention includes such other forms and modifications as are embraced by the scope of the appended claims.

It is claimed and desired to secure by Letters Patent:

1. A track link structure comprising, in combination, a pair of transversely spaced side bars, a hinge member having one end portion embraced by one of said side bars and another end portion embraced by the other of said side bars, first and second internal wedge seating surfaces formed, respectively, on said side bars, a first external wedge seating surface presented by said one end portion of said hinge member in radially spaced relation to said first internal wedge seating surface and in inclined relation to the axis of said hinge member, a second external wedge seating surface presented by said other end portion of said hinge member in radially spaced relation to said second internal wedge seating surface and in inclined relation to the axis of said hinge member, first and second wedge members slidably cooperable, respectively, with said first and second external wedge seating surfaces and having load transmitting surface portions, respectively, engageable with said first and second internal wedge seating surfaces upon sliding movement of said wedge members on said external wedge seating surfaces in wedge tightening directions obliquely away from the axis of said hinge member, and adjusting means operable to move said first and second wedge members in said wedge tightening directions relative to said hinge member.

2. A track link structure as set forth in claim 1, in which said first and second internal wedge seating surfaces extend parallel to the axis of said hinge member.

3. A track link structure as set forth in claim 1, in which said first and second external wedge seating surfaces are inclined in opposite directions, respectively, relative to the axis of said hinge member.

4. A track link structure as set forth in claim 1, in which the inclination of said first external wedge seating surface is such that sliding movement of said first wedge member thereon in a direction toward the axially outer extremity of said one end portion of said hinge member will establish cooperative engagement of said load transmitting surface of said first wedge member with said first internal wedge seating surface, and in which the inclination of said second external wedge seating surface is such that sliding movement of said second wedge member thereon in a direction toward the axially outer extremity of said other end portion of said hinge member will establish cooperative engagement of said load transmitting surface of said second wedge member with said second internal wedge seating surface.

5. A track link structure as set forth in claim 1, in which said first and second external wedge seating surfaces extend straight between circumferentially spaced edge lines on the peripheries of said end portions, respectively, of said hinge member.

6. A track link structure as set forth in claim 1, in which said adjusting means comprise a threaded shank portion connected with said first wedge member and extending axially of and beyond said one end portion of said hinge member, another threaded shank portion connected with said second wedge member and extending axially of and beyond said other end portion of said hinge member, and nuts screwed upon said threaded shank portions for cooperative engagement with thrust transmitting abutments at the outer sides, respectively, of said side bars.

7. In a track belt for crawler tractors, the combination of a hinge pin, a wedge seating radial recess formed in an axially extending end portion of said hinge pin, a wedge member seated in said recess and projecting radially outward from said end portion of said hinge pin, a side bar having a keyhole shaped aperture in axially slidable engagement with said end portion and wedge member, and adjusting means operable to move said wedge member within said keyhole shaped aperture relative to and in the axial direction of said hinge pin.

8. In a track belt for crawler tractors, the combination of, a hinge pin having at one of its ends a cylindrical axially extending external surface portion intersected by two plane external surface portions extending transversely of and obliquely in opposite directions relative to the axis of said hinge pin so as to form a transverse groove in said one end of said hinge pin, a wedge member having a ridge projecting into said groove, a side bar having a keyhole shaped aperture in axially slidable engagement with said cylindrical surface portion of said hinge pin and with said wedge member, a shank connected with and extending from said wedge member axially of said hinge pin and having a threaded portion at the axially outer side of said side bar, and a nut screwed upon said threaded portion of said shank for cooperative engagement with an abutment at said axially outer side of said side bar.

9. In a track belt for crawler tractors, the combination of, a hinge pin having at one of its ends a cylindrical axially extending external surface portion intersected by two plane external surface portions extending transversely of and obliquely in opposite directions relative to the axis of said hinge pin so as to form a transverse ridge on said one end of said hinge pin, a wedge member having a groove in straddling relation to said ridge, a side bar having a keyhole shaped aperture in axially slidable engagement with said cylindrical surface portion of said hinge pin and with said wedge member, a shank connected with and extending from said wedge member axially of said hinge pin and having a threaded portion at the axially outer side of said side bar, and a nut screwed upon said threaded portion of said shank for cooperative engagement with a thrust transmitting abutment at said axially outer side of said side bar.

FREDERICK A. SCHICK.

REFERENCES CITED

The following references are of record in the file of this patent:

UNITED STATES PATENTS

| Number | Name | Date |
| --- | --- | --- |
| 2,258,430 | Taylor | Oct. 7, 1941 |
| 2,330,794 | Schonitzer et al. | Sept. 28, 1943 |
| 2,517,429 | Henning | Aug. 1, 1950 |